(12) United States Patent
Park et al.

(10) Patent No.: US 11,361,052 B2
(45) Date of Patent: Jun. 14, 2022

(54) METHOD OF FORMATTING A WEIGHT MATRIX, AN ACCELERATOR USING THE FORMATTED WEIGHT MATRIX, AND A SYSTEM INCLUDING THE ACCELERATOR

(71) Applicants: SK hynix Inc., Icheon (KR); POSTECH ACADEMY-INDUSTRY FOUNDATION, Pohang (KR)

(72) Inventors: Junki Park, Pohang (KR); Jae-Joon Kim, Pohang (KR); Youngjae Jin, Seoul (KR); Euiseok Kim, Icheon (KR)

(73) Assignees: SK hynix Inc., Icheon (KR); POSTECH ACADEMY-INDUSTRY FOUNDATION, Pohang (KR)

( * ) Notice: Subject to any disclaimer, the term of this patent is extended or adjusted under 35 U.S.C. 154(b) by 213 days.

(21) Appl. No.: 16/748,706

(22) Filed: Jan. 21, 2020

(65) Prior Publication Data
US 2020/0257753 A1 Aug. 13, 2020

(30) Foreign Application Priority Data
Feb. 12, 2019 (KR) ................ 10-2019-0015840

(51) Int. Cl.
*G06F 17/16* (2006.01)
*G06N 3/04* (2006.01)
*G06N 3/08* (2006.01)
*G06F 7/544* (2006.01)

(52) U.S. Cl.
CPC ............ *G06F 17/16* (2013.01); *G06F 7/5443* (2013.01); *G06N 3/04* (2013.01); *G06N 3/08* (2013.01)

(58) Field of Classification Search
CPC ......... G06F 17/16; G06F 7/5443; G06N 3/04; G06N 3/08
See application file for complete search history.

(56) References Cited

U.S. PATENT DOCUMENTS

| | | | |
|---|---|---|---|
| 2005/0125369 A1* | 6/2005 | Buck | ................. G06K 9/00986 706/12 |
| 2018/0046914 A1 | 2/2018 | Li et al. | |
| 2018/0082181 A1 | 3/2018 | Brothers et al. | |

(Continued)

FOREIGN PATENT DOCUMENTS

KR 20190128795 A 11/2019

OTHER PUBLICATIONS

P. Ouyang, et al., "A fast and power efficient architecture to parallelize LSTM based RNN for cognitive intelligence applications," in Design Automation Conference (DAC), Jun. 2017, pp. 63:1-63:6. 6 pages.

(Continued)

*Primary Examiner* — Michael D. Yaary (57) ABSTRACT

A method for formatting a weight matrix including a plurality of sub matrices each being multiplied with an input vector may include sequentially adding weight information included in respective first columns of the plurality of sub matrices to formatted data; and sequentially adding weight information included in respective second columns of the plurality of sub matrices to the formatted data after the weight information from the first columns of the plurality of sub matrices. The weight information may be non-zero weight information.

19 Claims, 9 Drawing Sheets

(56) References Cited

U.S. PATENT DOCUMENTS

2018/0197067 A1* 7/2018 Mody ............... G06N 3/063
2020/0117700 A1* 4/2020 Chatterjee ........... G06N 3/08

OTHER PUBLICATIONS

J. Fowers et al., "A high memory bandwidth FPGA accelerator for sparse matrix-vector multiplication," in IEEE Int. Symp. Field-Programmable Custom Computing Machines (FCCM), 2014, pp. 36-43. 8 pages.
R. Dorrance, et al., "A scalable sparse matrix- vector multiplication kernel for energy-efficient sparse-blas on FPGAs," in international symposium on Field-programmable gate arrays (FPGA). ACM, 2014, pp. 161-170. 9 pages.
E. Nurvitadhi, et al., "Accelerating recurrent neural networks in analytics servers: Comparison of FPGA, CPU, GPU, and ASIC," in Field Programmable Logic and Applications (FPL). IEEE, 2016, 4 pages.
M Kock and A. Paramythis, "Activity sequence modelling and dynamic clustering for personalized e-learning," User Modeling and User-Adapted Interaction, vol. 21, No. 1, Apr. 2011. pp. 51-97. 47 pages.
M. Rizakis et al., "Approximate FPGA-based LSTMs under computation time constraints," in International Symposium in Applied Reconfigurable Computing (ARC), 2018. 13 pages.
K. Papineni, et al., "BLEU: a method for automatic evaluation of machine translation," in association for compu-tational linguistics (ACL). Association for Computational Linguistics, 2002, pp. 311-318. 8 pages.
S. Wang, et al., "C-LSTM: Enabling efficient LSTM using structured compression tech-niques on FPGAs," in International Symposium on Field-Programmable Gate Arrays. ACM, 2018, pp. 11-20. 10 pages.
A. See, M.-T. Luong, and C. D. Manning, "Compression of neural machine translation models via pruning," Conference on Computational Natural Language Learning (CoNLL), 2016. pp. 291-301. 11 pages.
A. Graves et al., "Connectionist temporal classification: labelling unseg-mented sequence data with recurrent neural networks," in International Conference on Machine Learning (ICML). ACM, 2006, pp. 369-376. 8 pages.
S. Han, et al., "Deep compression: Compressing deep neural network with pruning, trained quantization and Huffman coding," CoRR, vol. abs/1510.00149, 2015. [Online]. Available: http://arxiv.org/abs/1510.00149. pp. 1-14. 14 pages.
A. Hannun, et al. "Deep speech: Scaling up end-to-end speech recognition," arXiv preprint arXiv:1412.5567, Dec. 19, 2014., 12 pages.
C. Gao, Chang et al., "DeltaRNN: A power-efficient recurrent neural network accelerator," in International Symposium Field-Programmable Gate Arrays (FPGA). ACM, 2018, pp. 21-30. 10 pages.
S. Han et al., "EIE: Efficient inference engine on compressed deep neural network," in International Symposium Computer Architecture (ISCA), 2016, pp. 243-254. 12 pages.
S. Han et al., "ESE: Efficient speech recognition engine with sparse LSTM on FPGA," in International symposium. Field-Programmable Gate Arrays (FPGA), 2017, pp. 75-84. 10 pages.
Y.-H. Chen, "Eyeriss: An energy- efficient reconfigurable accelerator for deep convolutional neural net-works," IEEE Journal of Solid-State Circuits (JSSC), vol. 52, No. 1, pp. 127-138, Jan. 2017. 12 pages.
First conference on machine translation, (WMT16). Aug. 2016, [Online]. Available: http://www.statmt.org/blueWMT16/. 1 page.
S. Shin, K. Hwang, and W. Sung, "Fixed-point performance analysis of recurrent neural networks," in International Conference on Acoustics, Speech and Signal Processing (ICASSP). IEEE, 2016, pp. 976-980. 5 pages.
S. Li, et al., "FPGA acceleration of recurrent neural network based language model", in International Sym-posium on Field-Programmable Custom Computing Machines (FCCM). IEEE, 2015, pp. 111-118. 8 pages.
M. Lee, et al., "FPGA-based low-power speech recognition with recurrent neural networks," in Signal Processing Systems (SiPS). IEEE, 2016, pp. 230-235. 6 pages.
Y. Guan, et al., "FPGA-based accelerator for long short-term memory recurrent neural networks," in Asia South Pacific Design Autom. Conf. (ASP-DAC), Jan. 2017, pp. 629-634. 6 pages.
Y. Wu, et al., "Googl* s neural machine translation system: Bridging the gap between human and machine translation," arXiv preprint arXiv:1609.08144, Oct. 2016. pp. 1-23. 23 pages.
S. Hochreiter et al., "Gradient flow in recurrent nets: the difficulty of learning long-term dependencies," 2001, ch. A field guide to dynamical recurrent neural networks. 1-15 pp. 15 pages.
C. Andre Xian Ming and C. Eugenio, "Hardware accelerators for recurrent neural networks on FPGA," in Circuits and Systems (ISCAS), 2017. 4 pages.
J. T. Pawlowski, "Hybrid memory cube (HMC)," in 2011 IEEE Hot Chips Symposium (HCS), 2011, pp. 1-24. 24 pages.
K. Cho, et al. "Learning Phrase Representations using RNN Encoder-Decoder for Statistical Machine Translation", Conference on Empirical Methods in Natural Language Processing (EMNLP); Sep. 2014, pp. 1724-1734; 15 pages.
S. Hochreiter and J. Schmidhuber, "Long short-term memory," Neural Computation, vol. 9, No. 8, 1997, pp. 1735-1780, 32 pages.
J. Park, et al., "Maximizing system performance by balancing computation loads in LSTM accelerators," in Design, Automation Test in Europe Conference Exhibition (DATE), 2018. pp. 7-12. 6 pages.
A. X. M. Chang, et al., "Recurrent neural networks hardware implementation on FPGA," International Journal of Advanced Research in Electrical Electronics and Instrumentation Engineering (IJAREEIE), Mar. 2016. 7 pages.
"Sequence to sequence learning with neural networks", Sutskever, I, et al. in Advances in neural information processing systems (NIPS), Dec. 2014, pp. 3104-3112. 9 pages.
S. Venugopalan, et al., "Sequence to sequence-video to text," in International Conference on Computer Vision (ICCV), 2015, pp. 4534-4542. 9 pages.
J. Devlin, et al., "Sharp models on dull hardware: Fast and accurate neural machine translation decoding on the CPU," Conference on Empirical Methods in Natural Language Processing (EMNLP), May 2017, pp. 2820-2825, 6 pages.
A. Graves, et al., "Speech recognition with deep recurrent neural networks," International Conference Acoustics, Speech and Signal Processing (ICASSP), Mar. 2013. pp. 6645-6649, 5 pages.
M. Abadi et al., "TensorFlow: Large-scale machine learning on heterogeneous distributed systems," abs/1603.04467, Mar. 2016. [Online], Available: http://arxiv.org/abs/1603.04467. pp 1-19. 19 pages.
A. Taylor, et al., "The Penn Treebank: an overview," in Treebanks. Springer, 2003, pp. 5-22. 18 pages.
J. S. Garafolo et al., "TIMIT acoustic-phonetic continuous speech corpus". (1993) [Online]. Available: https://catalog.ldc.upenn.edu/ldc93s1. 1 page.
H. Yu et al., "Video paragraph captioning using hierarchical recurrent neural networks," Conference on Computer Vision and Pattern Recog-nition (CVPR), Apr. 2016, pp. 4584-4593, 10 pages.

* cited by examiner

| $x_0$ | $x_1$ | $x_2$ | $x_3$ |
|---|---|---|---|

| | $W_{f0,1}$ | | |
|---|---|---|---|
| | | | $W_{f1,3}$ |
| | | | $W_{f2,3}$ |
| | | $W_{f3,2}$ | |

$W_f$

| $x_0$ | $x_1$ | $x_2$ | $x_3$ |
|---|---|---|---|

| | | | $W_{o0,3}$ |
|---|---|---|---|
| | $W_{o1,1}$ | | |
| | | $W_{o2,2}$ | |
| | $W_{o3,1}$ | | |

$W_o$

| $x_0$ | $x_1$ | $x_2$ | $x_3$ |
|---|---|---|---|

| $W_{i0,0}$ | | | |
|---|---|---|---|
| | | $W_{i1,2}$ | |
| $W_{i2,0}$ | | | |
| | | | $W_{i3,0}$ |

$W_i$

| $x_0$ | $x_1$ | $x_2$ | $x_3$ |
|---|---|---|---|

| $W_{c0,0}$ | | | |
|---|---|---|---|
| $W_{c1,0}$ | | | |
| $W_{c2,0}$ | | | |
| | | $W_{c3,2}$ | |

| a: | $W_{0,0}$ | $W_{2,0}$ | $W_{0,8}$ | $W_{1,8}$ | $W_{2,8}$ | $W_{0,5}$ | $W_{3,5}$ | $W_{1,13}$ | $W_{3,13}$ | $W_{1,2}$ | $W_{3,2}$ | $W_{3,10}$ | $W_{2,14}$ | $W_{1,7}$ | $W_{2,7}$ | $W_{0,15}$ |
|---|---|---|---|---|---|---|---|---|---|---|---|---|---|---|---|---|
| b: | 0 (0) | 2 (0) | 0 (0) | 1 (0) | 2 (0) | 0 (1) | 3 (1) | 1 (1) | 3 (1) | 1 (2) | 3 (2) | 3 (2) | 2 (2) | 1 (3) | 2 (3) | 0 (3) |
| c: | 2 | 0 | 3 | 0 | 0 | 2 | 0 | 2 | 2 | 0 | 1 | 1 | 0 | 2 | 0 | 1 |
| d: | $x_0$ | $x_0$ | $x_0$ | $x_0$ | $x_0$ | $x_1$ | $x_1$ | $x_1$ | $x_1$ | $x_2$ | $x_2$ | $x_2$ | $x_2$ | $x_3$ | $x_3$ | $x_3$ |

31, 32, 33, 34 e:

| PE | RID |
|---|---|
| 0 | 0 |
| 1 | 1 |
| 2 | 2 |
| 3 | 3 |

35 a: Value
b: Row Number (Element Address)
c: Column Length
d: Access order of an element in the input vector
e: Information on Row Allocation to Processing Elements

FIG. 8

METHOD OF FORMATTING A WEIGHT MATRIX, AN ACCELERATOR USING THE FORMATTED WEIGHT MATRIX, AND A SYSTEM INCLUDING THE ACCELERATOR

CROSS-REFERENCE TO RELATED APPLICATIONS

The present application claims priority under 35 U.S.C. § 119(a) to Korean Patent Application No. 10-2019-0015840, filed on Feb. 12, 2019, which is incorporated herein by reference in its entirety.

BACKGROUND

1. Technical Field

Embodiments generally relate to a method of formatting a weight matrix used for a neural network, an accelerator configured to use the formatted weight matrix, and a system including the accelerator.

2. Related Art

Various kinds of neural networks are used in the field of artificial intelligence technology for applications such as speech recognition, image recognition, and machine translation.

A neural network includes a plurality of layers each of which contains multiple neurons that are connected with synapses.

A weight is assigned to each of the synapses. A weight matrix includes a plurality of weights arranged in rows and columns.

The weights constituting the weight matrix are determined in advance through a training process.

Various techniques have been developed to reduce a data size of the weight matrix in order to reduce memory capacity that is required to store the weight matrix.

For example, a pruning technique may be applied to make some weights of the weight matrix be zero.

In the pruned weight matrix, a weight that has a zero value does not affect a result of the multiplication between the weight matrix and an input vector, which allows the weight matrix to be formatted so as not to store weights having zero values into a memory.

Commonly used formatting methods include a Compressed Sparse Row (CSR) method, a Compressed Sparse Column (CSC) method, and a Compressed Interleaved Sparse Row (CISR) method.

The weight matrix is multiplied by an input vector corresponding to input data, which may be from outside the neural network or from a previous level of neurons of the neural network. In this case, each element of the input vector is stored in the memory device. When performing an operation for each row of the weight matrix, time required for accessing the memory device increases when each element of the input vector is randomly accessed.

For example, assume the size of a buffer that stores the input vector is 128 elements.

If multiplication is performed on the first row of the weight matrix, memory accesses must be performed more than once if elements other than those corresponding to $0^{th}$ through $127^{th}$ elements of the input vector are required during the multiplication. If an element required for the multiplication changes randomly, the number of memory accesses is further increased.

This problem may similarly occur when the multiplication is performed on other rows of the weight matrix, and the operation time may be further increased when size of the weight matrix and number of elements of the input vector are increased.

When the weight matrix is a sparse matrix, elements of the input vector required for multiplication are more likely to be distributed discontinuously, and thus, memory latency may increase accordingly.

This problem may be exacerbated when a plurality of processing elements (PEs) are used for parallel processing.

Each of the plurality of PEs needs to access input data individually and a problem arises when a PE waits while corresponding data is read from the memory.

Accordingly, even if the number of the PEs is increased, access time to the memory device storing the input data may increase, and thus the overall performance may not be sufficiently improved.

SUMMARY

In accordance with the present teachings, a method of formatting a weight matrix including a plurality of sub matrices each being multiplied with an input vector may include adding weight information included in respective first columns of the plurality sub matrices to formatted data; and adding weight information included in respective second columns of the plurality of sub matrices to the formatted data after adding the weight information included in the respective first columns of the plurality sub matrices.

In accordance with the present teachings, an accelerator may include a data memory storing an input vector; a global buffer configured to store all or some of elements of the input vector; one or more processing elements (PEs) each including a respective local buffer; and a control circuit configured to provide a selected PE among the one or more PEs with row information extracted from a formatted data including information of a weight matrix, wherein each local buffer stores a part of elements stored in the global buffer and selects one of the part of elements using column information extracted from the formatted data.

In accordance with the present teachings, a system may include an accelerator including one or more processing elements (PEs) each performing a multiplication operation with a weight of a weight matrix and an element of an input vector; a neural network format circuit configured to generate formatted data by formatting the weight matrix such that elements in the input vector are sequentially accessed by the accelerator when the accelerator is used to perform an inference operation; and a neural network application circuit configured to control the inference operation by providing the formatted data and the input vector to the accelerator.

BRIEF DESCRIPTION OF THE DRAWINGS

The accompanying figures, wherein like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

In embodiments of the present disclosure, a Long Short-Term Memory (LSTM) network is used as an example of a neural network. However, embodiments are not limited to the LSTM network. Embodiments may be applied to any application wherein a plurality of sub weight matrices are each multiplied with the same input data, including neural networks having a plurality of sub weight matrices per each layer.

A weight matrix may be referred to as a matrix and a sub weight matrix may be referred to as a sub matrix in the following disclosure.

Moreover, an input data or an input signal to be multiplied with a matrix may be represented as an input vector.

Figure 1:
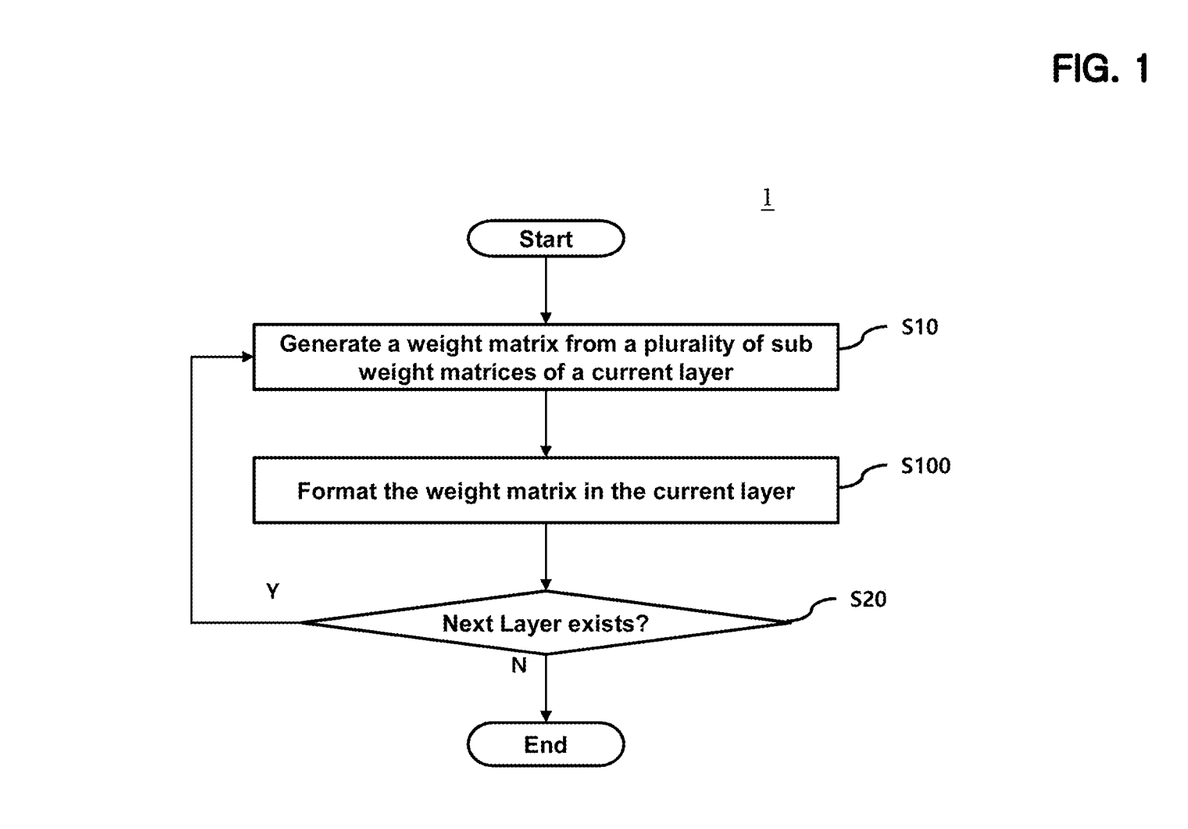
FIG. 1 illustrates a process of generating one or more weight matrixes according to an embodiment of the present disclosure.

FIG. 1 illustrates a flow chart of a process 1 for formatting a weight matrix when there are a plurality of layers according to an embodiment of the present disclosure.

First, at step S10 a weight matrix is generated from a plurality of sub matrices corresponding to a current layer.

Figure 4:
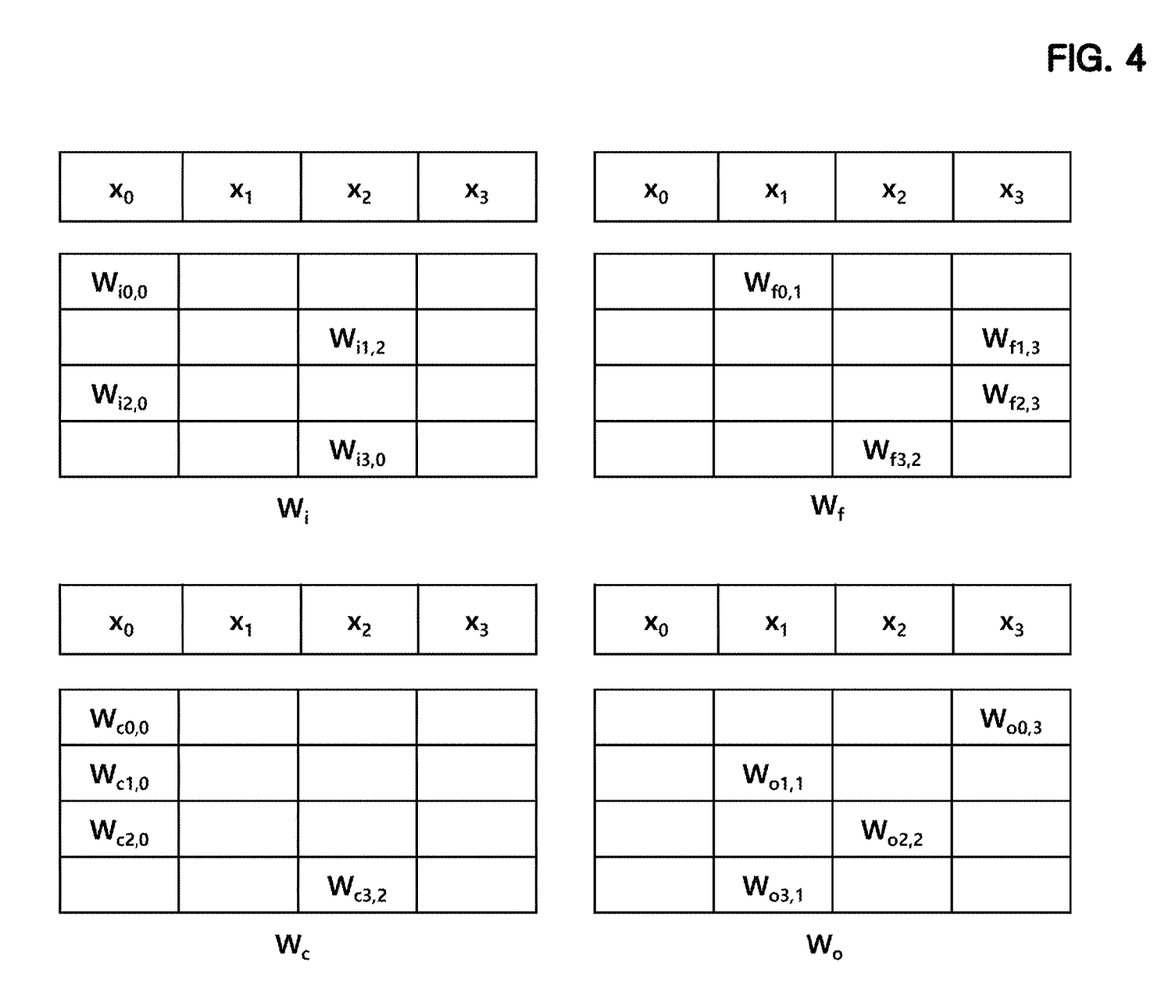
FIG. 4 illustrates a plurality of sub weight matrices to be multiplied with an input vector according to an embodiment of the present disclosure
Figure 5:
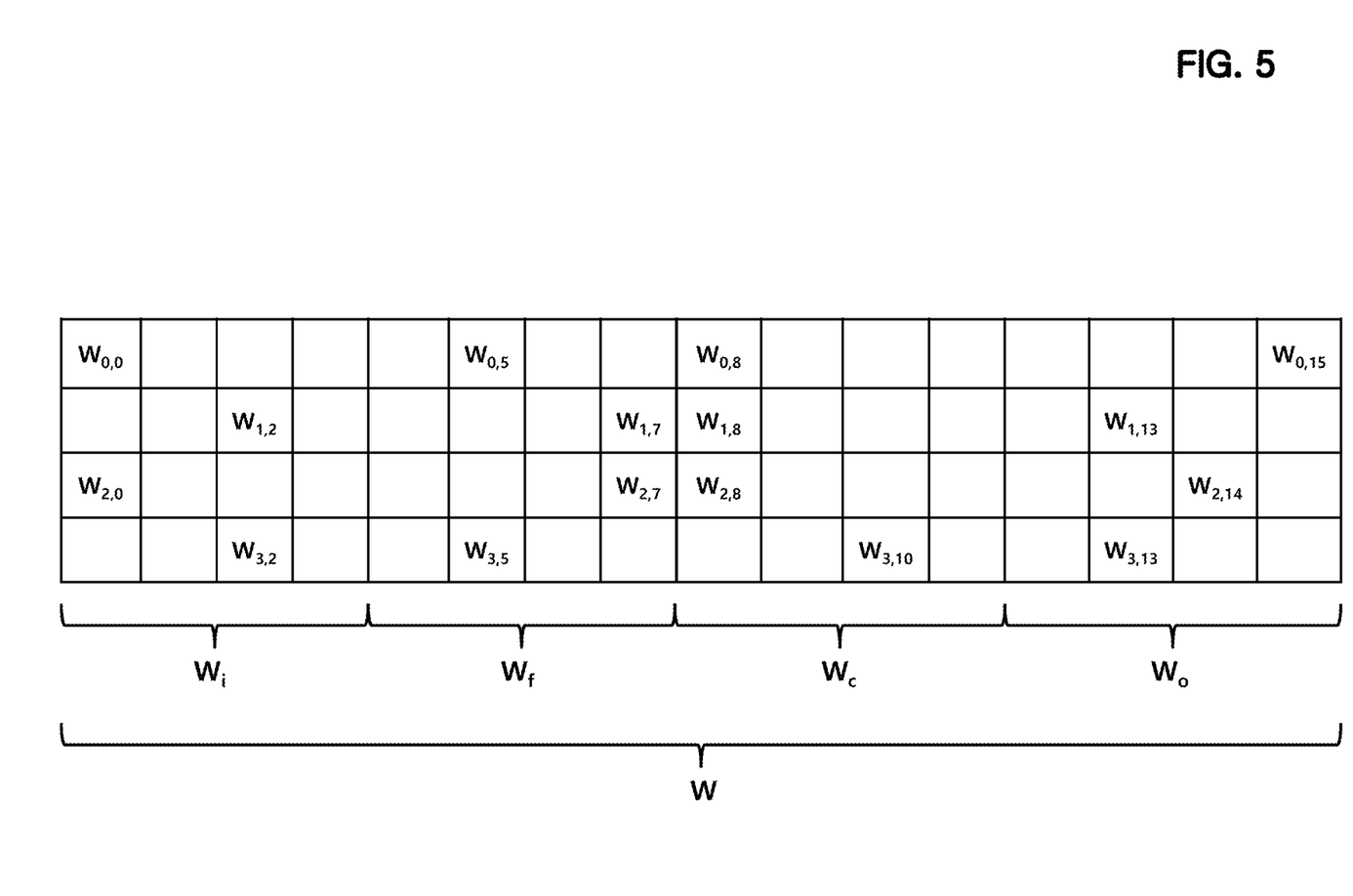
FIG. 5 illustrates a weight matrix generated from a plurality of sub weight matrices according to an embodiment of the present disclosure.

FIG. 4 illustrates a plurality of sub weight matrices that are to be multiplied with a common input vector, and FIG. 5 illustrates a weight matrix generated by combining the plurality of sub weight matrices.

In FIG. 4, $x_0$, $x_1$, $x_2$, and $x_3$ represent elements of the input vector x.

In FIG. 4, $W_i$ may be a sub weight matrix corresponding to an input gate used in an LSTM neural network, $W_f$ may be a sub weight matrix corresponding to a forget gate used in the LSTM neural network, $W_c$ may be a sub weight matrix corresponding to a cell gate used in the LSTM neural network, and $W_o$ may be a sub weight matrix corresponding to an output gate used in the LSTM neural network.

Hereinafter, $W_i$ may be referred to as an input matrix, $W_f$ may be referred to as a forget matrix, $W_c$ may be referred to as a cell matrix, and $W_o$ may be referred to as an output matrix.

In the LSTM network, not only an input vector $x_t$ input to the current layer at the current time but also an output vector $h_{t-1}$ output at the previous time in the current layer can be used for matrix calculation.

To this end, there may be further included a sub weight matrix to be multiplied by the output vector $h_{t-1}$ which was output at the previous time.

Hereinafter, the present disclosure will be described based on the input vector x and the sub weight matrices $W_i$, $W_f$, $W_c$, and $W_o$ calculated with the input vector x.

Since the description of the output vector $h_{t-1}$ and the sub weight matrix operated therewith may be easily derived by those skilled in the art, a detailed description thereof will be omitted. Moreover, since operations in the LSTM network are well known, the description thereof will be omitted.

In FIG. 4, it is assumed that each sub weight matrix has already been pruned.

FIG. 5 illustrates a method of arranging the sub matrices of FIG. 4 into a matrix. Since various pruning techniques are known, the description thereof will be omitted.

In FIG. 5, the input matrix $W_i$, the forget matrix $W_f$, the cell matrix $W_c$, and the output matrix $W_o$ are juxtaposed such that rows thereof are shared.

That is, the weight matrix W is generated by arranging columns of the forget matrix $W_f$ after the last column of the input matrix $W_i$, by arranging columns of the cell matrix $W_c$ after the last column of the forget matrix $W_f$, and by arranging columns of the output matrix $W_o$ after the last column of the cell matrix $W_c$.

Accordingly, an element $W_{i\ m,n}$ of the input matrix $W_i$ corresponds to an element $W_{m,n}$ of the weight matrix W, an element $W_{f\ m,n}$ of the forget matrix $W_f$ corresponds to an element $W_{m,n+4}$ of the weight matrix W, an element $W_{c\ m,n}$ of the cell matrix $W_c$ corresponds to an element $W_{m,n+8}$ of the weight matrix W, and an element $W_{o\ m,n}$ of the output matrix $W_o$ corresponds to an element $W_{m,n+12}$ of the weight matrix W (m, n are integers, $0 \leq m \leq 3$, $0 \leq n \leq 3$).

Returning to FIG. 1, the weight matrix W of the current layer is formatted at step S100.

Thereafter, at step S20 it is determined whether a next layer exists. If the next layer exists, the above-described operations are repeated with the next layer as the current layer, otherwise the process is terminated.

Figure 2:
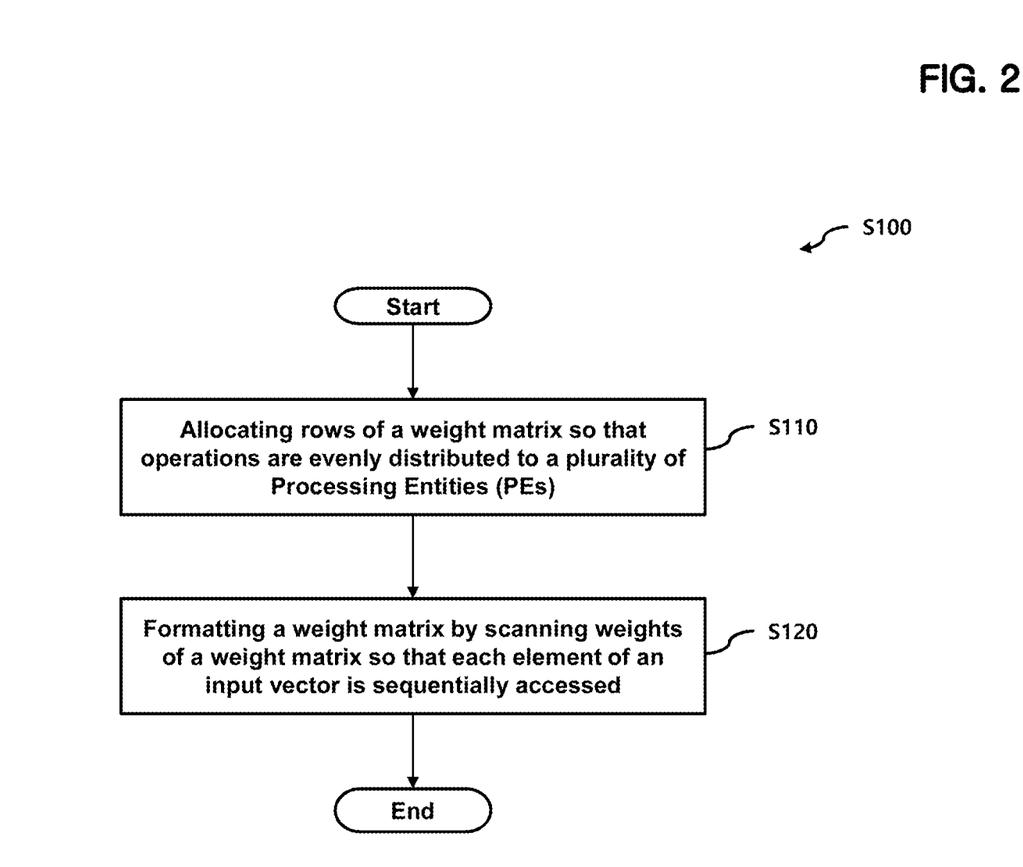
FIG. 2 illustrates a process of formatting a weight matrix of a neural network layer according to an embodiment.

FIG. 2 is a flow chart illustrating a method of formatting a weight matrix for each layer in an embodiment of the present disclosure.

First, at step S110 rows of the weight matrix are allocated to a plurality of PEs so that the number of calculations is evenly distributed to the plurality of PEs.

In an embodiment where only one PE is used, the step S119 can be omitted. In the present disclosure, it is assumed that four PEs are used.

In FIG. 5, there are 4 rows in the weight matrix W and the length of each row is 4, where the length of a row is determined by the number of non-zero weights in that row.

Accordingly, in this embodiment and with this illustrative weight matrix, the number of calculations can be evenly distributed by allocating a respective row to each PE.

For example, the $0^{th}$ row can be assigned to $0^{th}$ PE, the $1^{st}$ row can be assigned to the $1^{st}$ PE, the $2^{nd}$ row can be assigned to the $2^{nd}$ PE, and the $3^{rd}$ row can be assigned to the $3^{rd}$ PE.

When a plurality of rows are allocated to a plurality of PEs, the number of calculations may be evenly distributed to the PEs by minimizing the difference between the maximum and the minimum of the respective sums of the lengths of the rows allocated to the PEs. For example, if the weight matrix had first to sixth rows having respective lengths of 3, 3, 2, 4, 4, and 1, and 4 PEs are used, then to evenly distribute the calculations the fourth row could be allocated to a first PE, the fifth row allocated to a second PE, the first and third rows allocated to third PE, and the second and sixth rows allocated to fourth PE, so that the minimum sum of lengths would by 4, and the maximum sum of lengths would be 5.

Korean Patent Application No. 10-2018-0052920, filed by the present inventor on May 5, 2018, discloses a method for formatting a weight matrix for uniformly distributing calculations to a plurality of PEs.

However, in embodiments of the present disclosure, a technique of uniformly distributing rows of weight matrices to a plurality of PEs should not be limited to those disclosed in Korean Patent Application No. 10-2018-0052920, and other methods may be applied.

Furthermore, though the illustrated embodiment includes a step for uniformly allocating rows of the weight matrix to a plurality of PEs, in other embodiments that may be omitted.

However, when there are a large number of PEs, the uniform allocation of calculations to PEs may help to improve performance.

Next, at step S120, weights of the weight matrix are scanned and sequentially formatted so that, when performing the operation of multiplying the input vector by the sub weight matrices, each element of the input vector may be sequentially accessed. This is specifically disclosed in FIG. 3. That is, the weights are formatted so that all of the weights that are to be multiplied by a first element of the input vector are in a first contiguous sequence in the formatted data, all of the weights that are to be multiplied by a second element of the input vector are in a second contiguous sequence in the formatted data after the first contiguous sequence, and so on.

Figure 3:
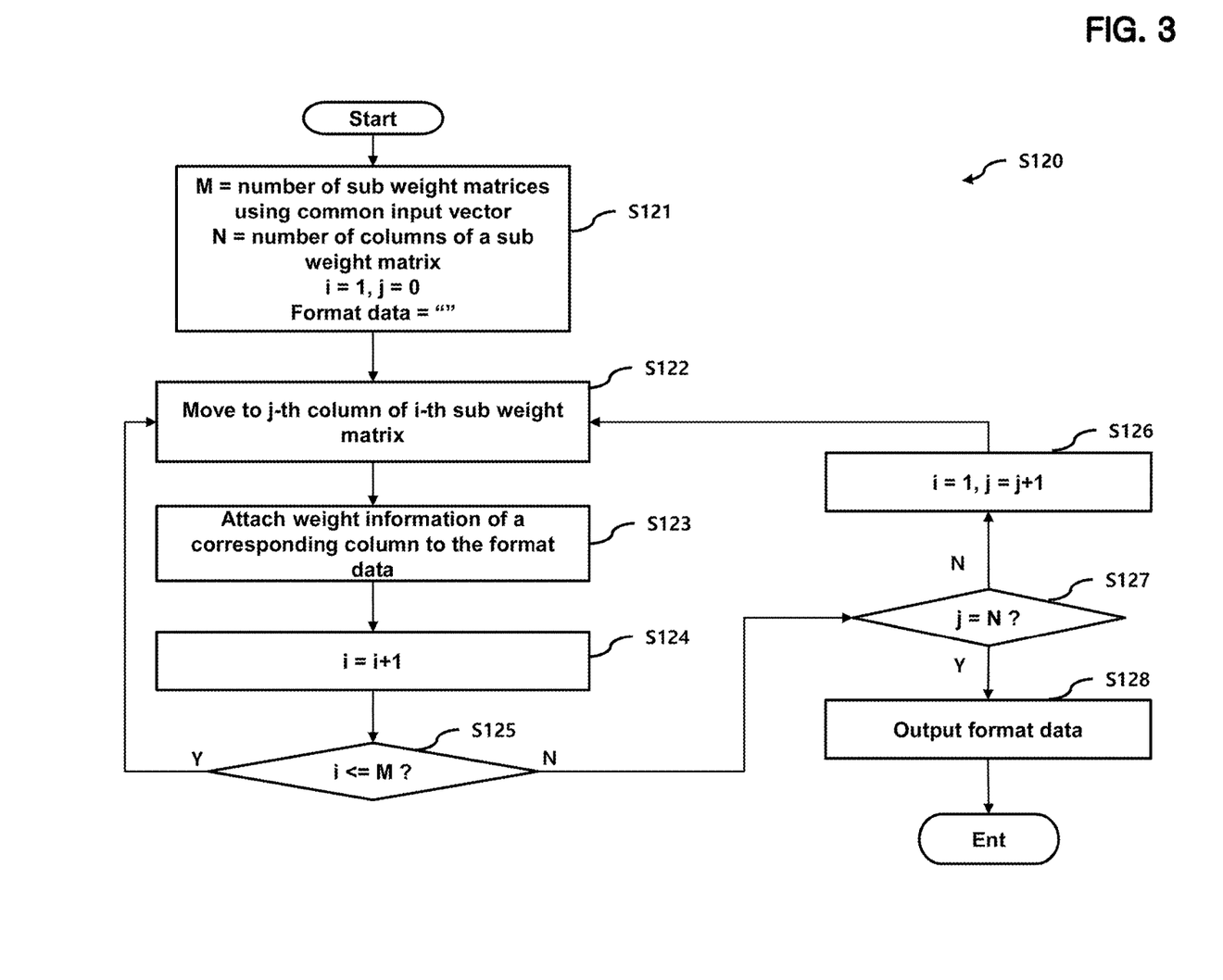
FIG. 3 illustrates a process of formatting a weight matrix to serialize access an input vector according to an embodiment

In the first step S121 of process S120 shown in FIG. 3, variables necessary for operation are initialized.

M corresponds to the number of sub weight matrices that are to be multiplied with the input vector, the sub weight matrices being numbered from 1 to M. In the illustrative example shown in FIG. 4, M is 4.

N corresponds to the number of columns in each of the sub weight matrix, the columns being numbered from 0 to N−1. In the illustrative example shown in FIG. 4, N is 4.

i is a variable identifying a sub weight matrix and j is a variable identifying a column. The variables i and j are initialized to 1 and 0 respectively.

The formatted data initially has an empty value.

At step S122, the process S120 begins processing the j-th column in the i-th sub weight matrix.

At step S123, information related to a non-zero weight of the column being processed is added to the formatted data.

Figure 6:
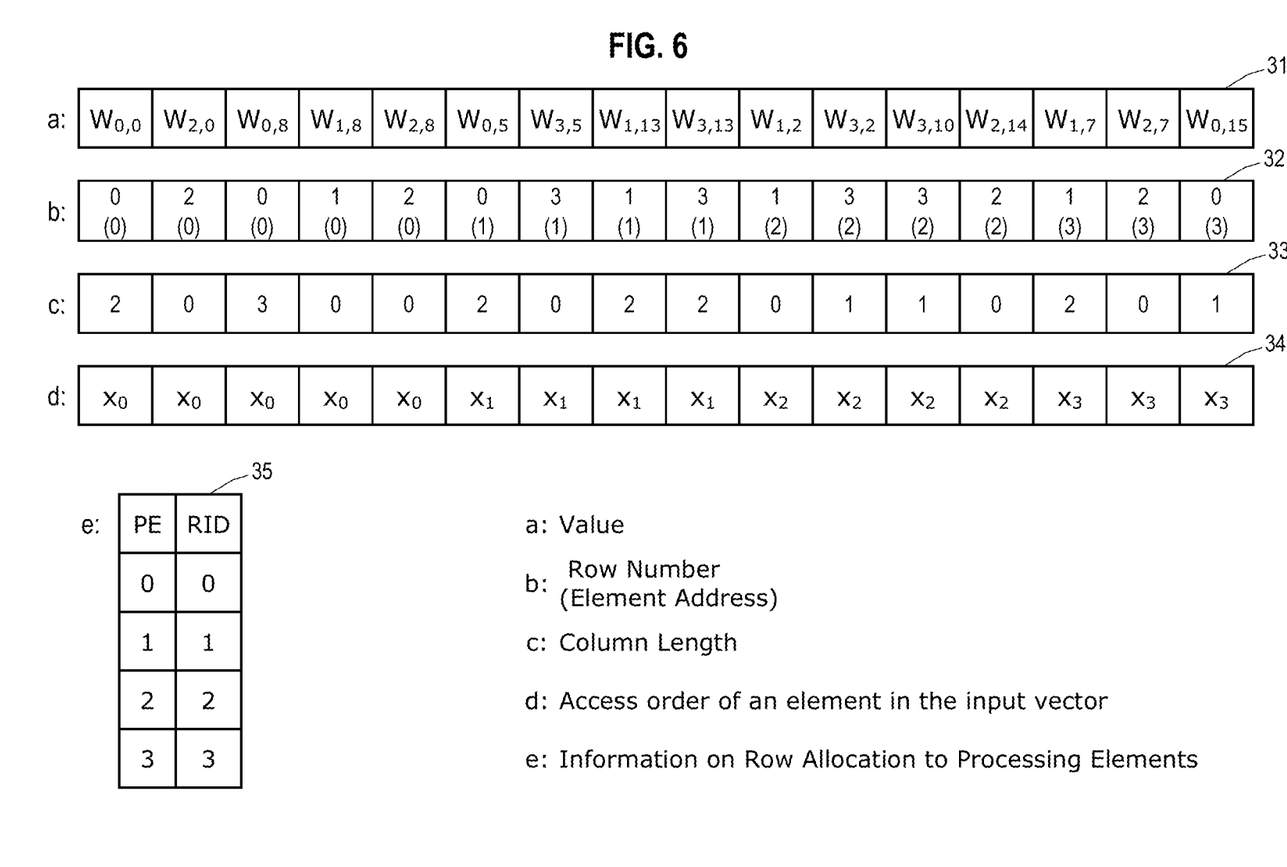
FIG. 6 illustrates formatted data corresponding to a weight matrix according to an embodiment of the present disclosure.

The content of the formatted data is shown in FIG. 6.

The formatted data includes (a) a value sequence 31 including values of weights from the weight matrix W of FIG. 4.

The formatted data may also include (b) a position sequence 32 including row numbers of the corresponding weights in the value sequence 31. The row number indicates a row where the weight is located in the weight matrix W. In an embodiment, the position sequence 32 may also include element addresses indicating an element of the input vector that is to be multiplied with the corresponding weight.

The element address is the same as the column number in each sub weight matrix and corresponds to j in FIG. 3.

Because the element addresses can be decoded using the column lengths in the column length sequence 33, described below, it is not necessary to include the element addresses in the formatted data.

The formatted data may also include (c) a column length sequence 33 including column lengths. The column length corresponds to column information used for decoding the column number in the decoder.

When there are a plurality of elements in one column and when the information about the column number is included in the formatted data for each element, the memory size may be increased due to the duplicated information. Accordingly, a column number of each weight can be decoded by storing the number of non-zero weights once for each column, which number corresponds to a column length.

As shown in FIG. 6, the length of the j-th column of the i-th sub weight matrix is sequentially recorded in the column length sequence 33. Thus, in the example shown in FIG. 6, the column length sequence 33 includes first a 2 to indicate that the first column of the first sub weight matrix has two non-zero weights, then a 0 to indicate that the first column of the second sub weight matrix has no non-zero weights, then a 3 to indicate that the first column of the third sub weight matrix has three non-zero weights, then a 0 to indicate that the first column of the fourth sub weight matrix has no non-zero weights, then a 0 to indicate that the second column of the first sub weight matrix has no non-zero weights, then a 2 to indicate that the second column of the second sub weight matrix has two non-zero weights, and so on. In the example shown, because there happen to be 16 non-zero weights in the weight matrix and the weight matrix has 16 column, the length of the column length sequence 33 is coincidentally the same as the length of the value sequence 31, but that is not necessarily the case.

Also shown in FIG. 6 is (d) an access order sequence 34 showing the access order of elements in the input vector, which corresponds to the element address (corresponding to the column number of the corresponding weight) shown in the position sequence 32. Therefore, the access order sequence 34 does not need to be included in the formatted data.

After that, the index i is increased at step S124.

At step S125, if i is less than or equal to M, the operations of steps S122, S123, and S124 are repeated with respect to the j-th column of the next sub weight matrix, as now indicated by i.

If i is greater than M, it is determined whether j is the last column because there is no next sub weight matrix. For this, it is determined whether j is equal to N at step S127.

If j is equal to N, then the current column is the last column of the last sub weight matrix. Therefore, the generation of the formatted data is considered to be complete, and the formatted data is output at step S128.

If j is not equal to N, i is initialized to 1 and j is increased at step S126. This corresponds to moving to the next column of the first sub weight matrix.

Thereafter, the process moves to the step S122 and the above-described operations of steps S122, S123, S124, S125, and S127 are repeated.

FIG. 6 also shows at (e) Processing Element (PE) allocation information 35 indication the allocation relationship between the rows of the weight matrix and the plurality of PEs.

If rows and PEs are related to each other according to a predetermined rule, it is not necessary to include the PE allocation information 35 in the formatted data.

When there are many rows in the weight matrix W and relationship between the rows of the weight matrix and the plurality of PEs is arbitrary, the PE allocation information 35 may be included in the formatted data.

An example of the final formatted data that can be output through the above-described formatting operation is shown in FIG. 6.

Figure 7:
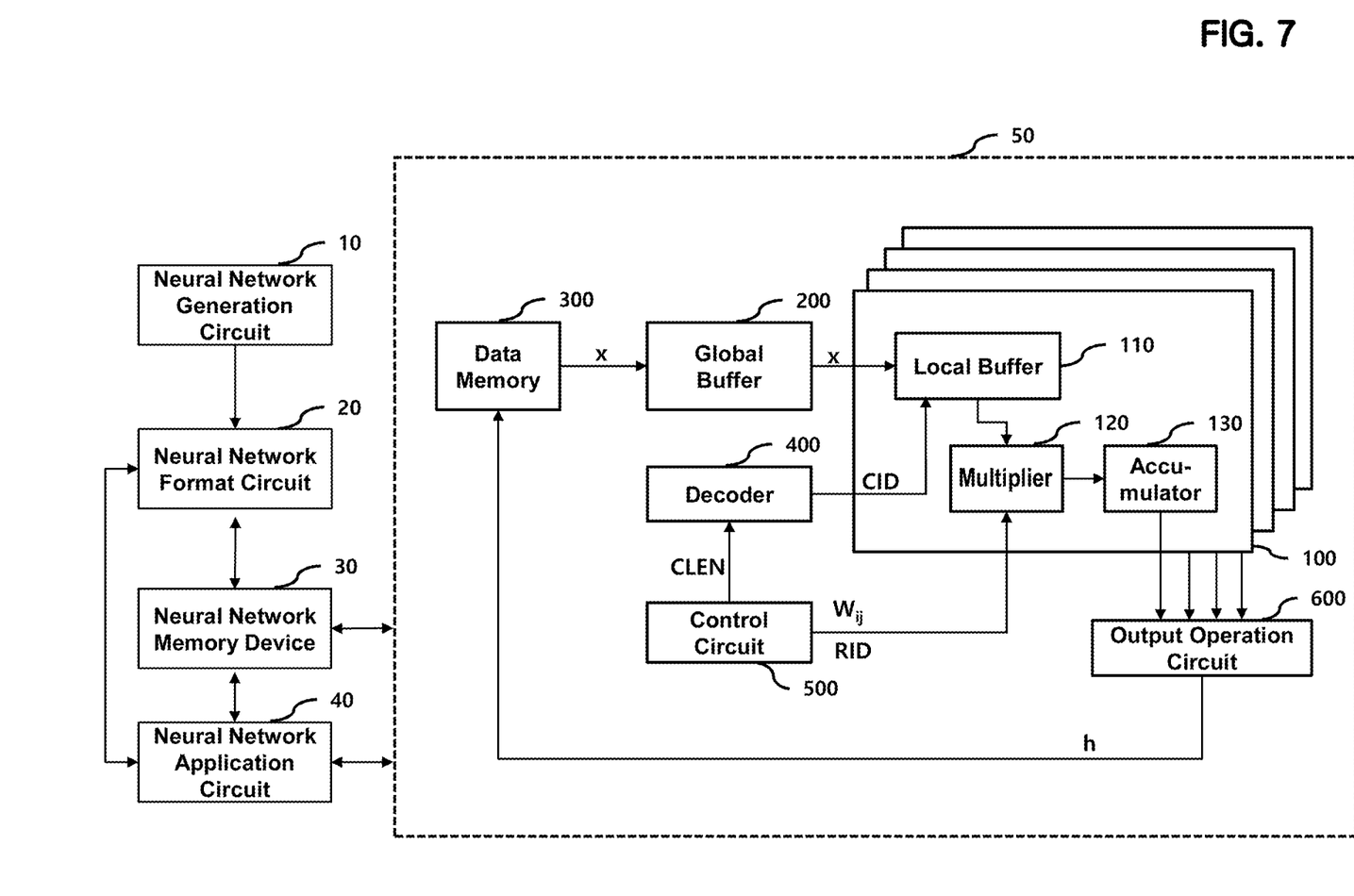
FIG. 7 illustrates a neural network system including an accelerator according to an embodiment of the present disclosure.

FIG. 7 illustrates a neural network system according to an embodiment of the present disclosure.

The neural network system includes a neural network generation circuit 10, a neural network format circuit 20, a neural network memory device 30, a neural network application circuit 40, and an accelerator 50.

The neural network generation circuit 10 performs a neural network training operation for determining a weight matrix of a neural network in order to generate the neural network. The neural network generation circuit 10 also prunes the weight matrix to make the weight matrix be sparse.

The neural network format circuit 20 performs the formatting operation described with respect to FIG. 3 in order to produce formatted data such as shown in FIG. 6.

The neural network memory device 30 stores the formatted data.

The neural network application circuit 40 controls an overall operation of generating an input vector from an externally input signal, controlling the accelerator 50 to generate an output vector, and outputting the output vector to the outside.

The neural network application circuit 40 may communicate with the neural network format circuit 20 to send and receive information relating to the neural network formatting operation and store the neural network format result in the memory device 30.

The accelerator 50 receives the formatted data stored in the neural network memory device 30, receives the input vector provided from the neural network application circuit 40 to perform a neural network operation to generate the output vector, and provides the output vector to the neural network application circuit 40.

In some embodiments, the accelerator 50 may directly read the formatted data stored in the neural network memory device 30 using a direct memory access (DMA) technique or may receive the formatted data via the neural network application circuit 40.

In this embodiment, the accelerator 50 includes a plurality of PEs 100, a global buffer 200, a data memory 300, a decoder 400, a control circuit 500, and an output operation circuit 600.

Although four PEs 100 are shown in the present embodiment, the number of PEs may vary depending on the embodiment.

The number of PEs 100 included in the accelerator 50 should match the number of PEs assumed to be available when performing the formatting process of FIG. 3.

The control circuit 500 controls the other components using the formatted data and controls the neural network operation for each layer.

The accelerator 50 generates the output vector h by performing operations with weights $W_{ij}$ from the value sequence 31 and the input vector x.

The control circuit 500 sequentially extracts weights $W_{ij}$ from the value sequence 31 of the formatted data and provides the weights $W_{ij}$ to the corresponding PE 100.

In this case, the relationship between the row number RID of the weight $W_{ij}$ (as indicated in the corresponding entry of the position sequence 32) and PE number provided by the PE allocation information 35 shown in FIG. 6 may be referred to.

The data memory 300 stores the input vector x and provides the input vector x to the PE 100 through the global buffer 200.

The global buffer 200 stores all or some elements of the input vector x.

The global buffer 200 is shared by a plurality of PEs 100 each including a respective local buffer 110 therein.

As described above, the weight matrix is formatted so that each element of the input vector can be used sequentially.

Accordingly, performance degradation due to memory accesses may be prevented.

The local buffer 110 and the global buffer 200 may be configured to reduce the number of memory accesses, thereby further improving performance, which will be described in detail below.

Each PE 100 respectively includes a local buffer 110, a multiplier 120 and an accumulator 130.

The local buffer 110 sequentially reads and stores the elements to be used in the PE 100 from the global buffer 200.

The multiplier 120 multiplies a corresponding element of the input vector x by the weight $W_{ij}$ provided by the control circuit 500, and the element of the input vector x is provided to the multiplier 120 from the local buffer 110 according to the column number CID output from the decoder 400.

The accumulator 130 accumulates multiplication result of the multiplier 120 by adding the multiplication result to a previously stored value.

The output operation circuit 600 generates the output vector h by summing operation results output from the plurality of PEs 100.

The output operation circuit 600 may perform additional operations on the operation results provided by the plurality of PEs 100.

The additional operation may be variously changed in accordance with various types of neural networks, so a detailed description thereof will be omitted.

When the operation for the current layer is finished, the control circuit 500 may perform a calculation operation for the next layer.

In such cases, the output vector h in the current layer may be used as the input vector x for the next layer.

The neural network application circuit 40 may complete the inference operation by using the output vector h for the final layer output from the accelerator 50.

The neural network system in FIG. 7 may be deployed in client-server architecture.

For example, the neural network generation circuit 10 and the neural network format circuit 20 may be located at the server end, and the neural network memory device 30, the neural network application circuit 40, and the accelerator 50 may be located at the client end.

For example, a machine translation system can be configured to receive and store formatted weight matrix data in a server and to store sentence data input through a microphone or the like in a mobile device.

At this time, the neural network format circuit 20 located in the server can communicate with the mobile device and generate formatted data. For example, if the mobile device provides the number of PEs to the server, the neural network format circuit 20 located in the server may generate and transmit the formatted data in correspondence with the number of PEs.

Those of ordinary skill in the art will be able to derive various embodiments with reference to the above disclosure.

Figure 8:
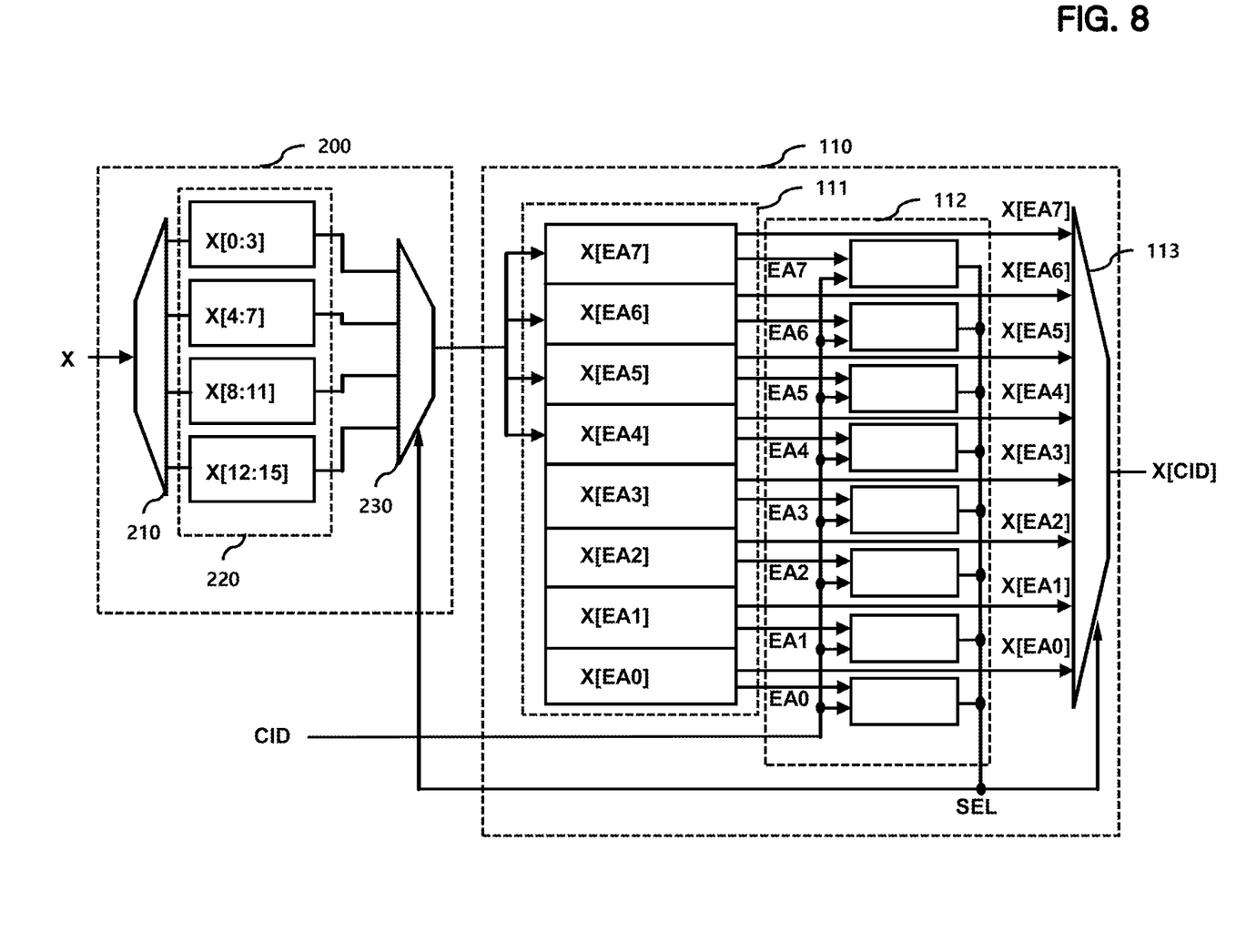
FIG. 8 shows a local buffer and a global buffer according to an embodiment of the present disclosure.

FIG. 8 shows a block diagram illustrating a local buffer 110 and a global buffer 200 according to an embodiment of the present disclosure.

To illustrate the operation of the embodiment shown in FIG. 8, it is assumed that the input vector x has 16 elements, but the embodiment is not limited to input vectors of that length.

The global buffer 200 includes a data divider 210, a first register 220, and a first selector 230.

In the present embodiment, the data divider 210 divides the 16 elements existing in the input vector x into four pieces each including 4 elements and provides each piece to a corresponding portion of the first register 220.

The first register 220 is divided into four groups, each storing four of the elements of the input vector.

The first selector 230 selects one of four groups of the first register 220 according to a selection signal SEL and provides it to the local buffer 110.

The local buffer 110 includes a second register 111, a comparator array 112, and a second selector 113.

The second register 111 includes a total of eight storage spaces. Each storage space stores one element of the input vector x, and may also store the element address (that is, the index) of the element.

One group of four input vector elements provided from the global buffer 200 may be respectively stored into fifth to eighth storage spaces of the second register 111. FIG. 8 shows input vector elements x[EA4] to x[EA7] stored in the fifth to eighth storage spaces of the second register 111, where EA4 to EA7 are indexes into the input vector.

Before the new data x[EA4] to x[EA7] was stored into the fifth to eighth storage spaces of the second register 111, the old data in the fifth to eighth storage spaces (here, x[EA0] to x[EA3]) were stored into the first to fourth storage spaces, respectively, of the second register 111.

The comparators included in the comparator array 112 compare the column numbers CID provided by the decoder 400 with the corresponding element addresses or indices EA0 to EA7, respectively, of the first to eighth storage spaces and output 0 if they are different from each other and outputs 1 if they are same.

The eight 1-bit signals output from the comparator array 112 constitute a selection signal SEL.

The second selector 113 outputs an element x[CID] of the input vector according to the selection signal SEL.

In the present embodiment, at the beginning of operation, x[EA4] to x[EA7] in the fourth to eighth storage spaces of the second register 111 are initialized with x[0:3].

According to the weight matrix formatting method of the present disclosure, elements of the input vector x are used sequentially from the first element to last element (that is, from x[0] to x[15]).

Accordingly, when the selection signal SEL is equal to a case where EA7 corresponds to the column number CID (and therefore x[3] in the eighth storage spaces of the second register 111 is being output for processing), the first selector 230 operates to select x[4:7] of the first register 220 for storage into the local buffer 110. At the same time, data stored in the fifth to eighth storage spaces of the second register 111 is stored in the first to fourth storage spaces of the second register 111.

Thereafter, when the selection signal SEL next indicates that EA7 is equal to the column number CID (and therefore that x[7] in the eighth storage spaces of the second register 111 is being output for processing), the first selector 230 operates to select x[8:11] of the first register 220 for storage into the local buffer 110. At the same time, data stored in the fifth to eighth storage spaces of the second register 111 is stored in the first to fourth storage spaces of the second register 111.

Finally, when the selection signal SEL next indicates that EA7 is equal to the column number CID (and therefore that x[11] in the eighth storage spaces of the second register 111 is being output for processing), the first selector 230 operates to select x[12:15] of the first register 220 for storage into the local buffer 110. At the same time, data stored in the fifth to eighth storage spaces of the second register 111 is stored in the first to fourth storage spaces x[EA0] to x[EA3] of the second register 111.

If a new input vector x is provided, the above operation is repeated from the initialization state.

Though FIG. 8 illustrates an embodiment in which one input vector x is stored in its entirety in the first register 220, the first register 220 may store a fraction, for example, ½ or ¼, of the elements of the input vector x.

In such a case, before all the elements stored in the first register 220 are used, the elements next to the elements previously used in the data memory 200 may be retrieved and stored into the data memory 200 with reference to the selection signal SEL.

As described above, in the present disclosure, the weight matrix is formatted so that the elements of the input vector are sequentially accessed, and an element of the input vector to be used is available at the local buffer 110 or the global buffer 200 when it is to be processed.

Accordingly, there is no need for the PE to halt to wait for a memory access, thereby improving the overall neural network computation performance.

Figure 9:
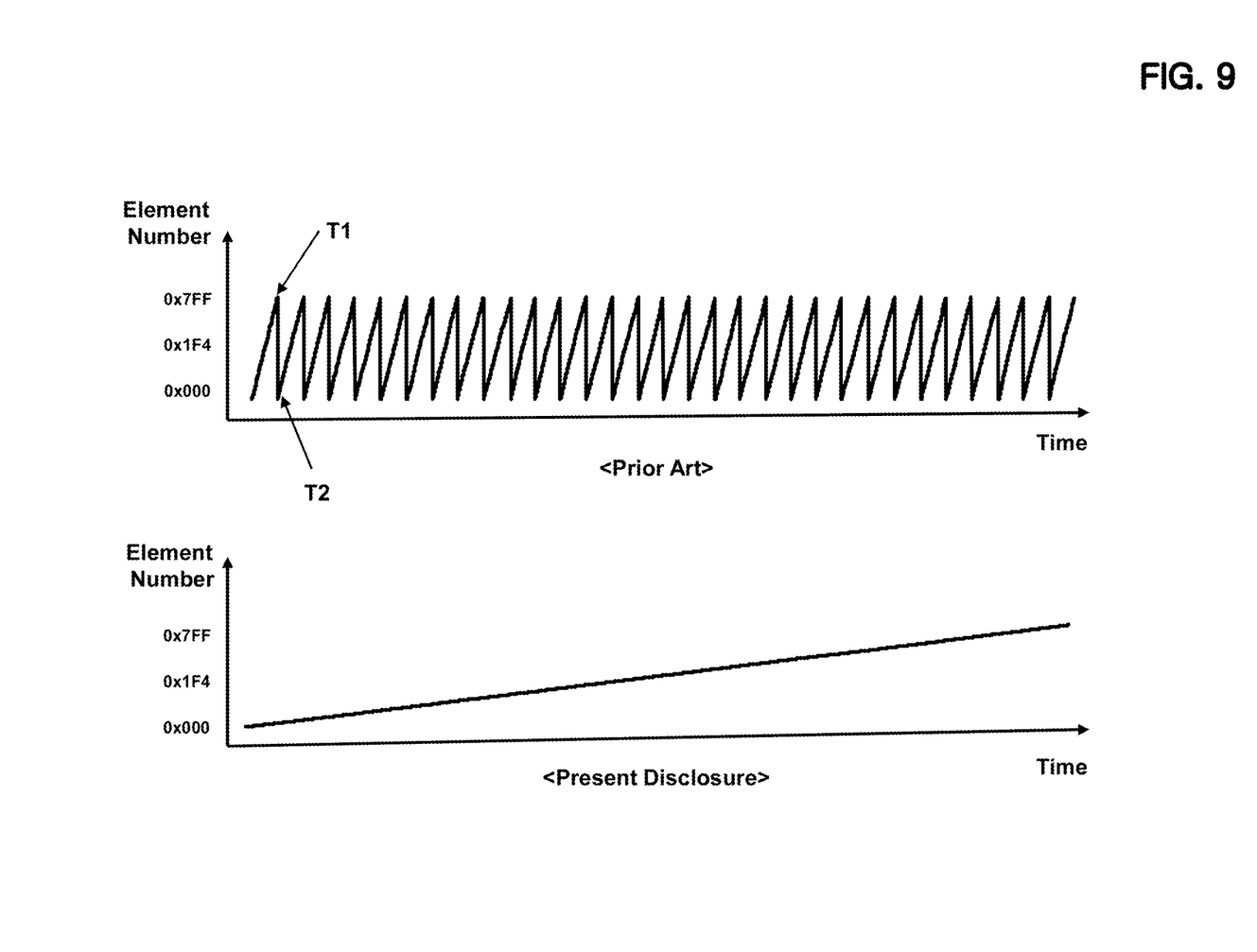
FIG. 9 illustrates an effect of an embodiment of the present disclosure.

FIG. 9 shows a graph illustrating an effect of an embodiment of the present disclosure.

In the prior art, the order in which weight matrix and the element number are processed may vary irregularly or rapidly with time.

As a result, there is a high possibility that an element necessary for performing the operation at T2 after an operation at T1 was performed does not exist in the buffer. In this case, an additional memory access must be performed.

In the prior art, such irregular memory accesses are frequently performed, which greatly degrades performance.

In the present disclosure, unnecessary memory accesses can be minimized because the element number is sequentially increased and necessary elements are therefore able to be buffered by using a global buffer and a local buffer.

As a result, performance degradation due to memory access does not occur in the present disclosure.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A method of formatting a weight matrix including a plurality of sub matrices each being multiplied with an input vector, the method comprising:
adding weight information included in respective first columns of the plurality sub matrices to formatted data;
adding weight information included in respective second columns of the plurality of sub matrices to the formatted data after adding the weight information included in the respective first columns of the plurality sub matrices;

generating the weight matrix by juxtaposing the plurality of sub matrices so that rows of the plurality of sub matrices are shared; and allocating a plurality of rows included in the weight matrix to a plurality of processing elements (PEs).

2. The method of claim 1, further comprising:
adding one or more row number respectively corresponding to the weight information included in the respective first columns of the plurality of sub matrices to the formatted data.

3. The method of claim 2, further comprising:
adding column lengths respectively corresponding to a number of non-zero weights included in the first column of each of the plurality of sub matrices to the formatted data.

4. The method of claim 1, further comprising:
adding information regarding allocation of the plurality of rows to the plurality of PEs in the formatted data.

5. The method of claim 1, wherein the allocating comprises:
calculating a row length of each of a plurality of rows included in the weight matrix based on a number of non-zero weights in each row; and
distributing the plurality of rows into the plurality of PEs so that difference between a maximum sum of row lengths and a minimum sum of row lengths are minimized.

6. An accelerator comprising:
a data memory storing an input vector;
a global buffer configured to store all or some of elements of the input vector;
one or more processing elements (PEs) each including a respective local buffer; and
a control circuit configured to provide a selected PE among the one or more PEs with row information extracted from a formatted data including information of a weight matrix,
wherein each local buffer stores a part of elements stored in the global buffer and selects one of the part of elements using column information extracted from the formatted data.

7. The accelerator of claim 6, wherein the column information includes a length of a column determined by a number of non-zero weights in the column, and
wherein the accelerator further comprises a decoder configured to generate a column number by decoding the column information, and to provide the column number with the local buffer.

8. The accelerator of claim 6, wherein each of the one or more PEs comprises:
a multiplier configured to multiply a weight value included in the weight information by an element provided from the local buffer; and
an accumulator configured to accumulate an output from the multiplier.

9. The accelerator of claim 6, further comprising:
an output operation circuit configured to an output vector generated from outputs from the one or more PEs.

10. The accelerator of claim 6, wherein the global buffer comprises:
a data divider configured to divide all or part of elements of the input vector into a plurality of pieces;
a first register including a plurality of groups, each group storing a corresponding piece among the plurality of pieces; and
a first selector configured to provide a group selected among the plurality of groups to the local buffer.

11. The accelerator of claim 10, wherein the local buffer comprises:
a second register storing all or part of the plurality of groups;
a comparator array configured to compare indices of elements stored in the second register with the column information; and
a second selector configured to output an element selected from the second register according to a selection signal corresponding to an output from the comparator array.

12. The accelerator of claim 10, wherein when the selection signal indicates an element among elements stored in the second register having a maximum index is selected, the first selector provides new group which is not stored in the second register among the plurality of groups to the second register.

13. The accelerator of claim 12, wherein the second register shifts data stored therein before storing the new group.

14. A system comprising:
an accelerator including one or more processing elements (PEs) each performing a multiplication operation with a weight of a weight matrix and an element of an input vector;
a neural network format circuit configured to generate formatted data by formatting the weight matrix such that elements in the input vector are sequentially accessed by the accelerator when the accelerator is used to perform an inference operation; and
a neural network application circuit configured to control the inference operation by providing the formatted data and the input vector to the accelerator.

15. The system of claim 14, wherein the accelerator comprises:
a data memory storing an input vector;
a global buffer configured to store one or more elements of the input vector;
one or more processing elements (PEs) respectively including one or more local buffers; and
a control circuit configured to provide a selected PE among the one or more PEs with weight information of a weight matrix by referring to row information extracted from a formatted data including information of the weight matrix,
wherein each of the one or more local buffers stores a part of elements stored in the global buffer and selects one of the part of elements by using column information extracted from the formatted data.

16. The system of claim 15, wherein the global buffer comprises:
a data divider configured to divide all or part of the input vector into a plurality of pieces, each piece respectively including one or more elements of the input vector;
a first register including a plurality of groups each storing a corresponding piece among the plurality of pieces; and
a first selector configured to provide a group selected among the plurality of groups to the local buffer.

17. The system of claim 16, wherein the local buffer comprises:
a second register storing all or part of the plurality of groups;
a comparator array configured to compare indices of elements stored in the second register with the column information; and a second selector configured to output an element selected from the second register according to a selection signal corresponding to an output from the comparator array.

18. The system of claim 17, wherein when the selection signal indicates an element among elements stored in the second register having a maximum index is selected, the first selector provides a new group among the plurality of groups to the second register, the new group being a group not stored in the second register.

19. The system of claim 14, further comprising a neural network generation circuit configured to provide the weight matrix by pruning an initial weight matrix generated by training a neural network.

* * * * *